Figure 1:
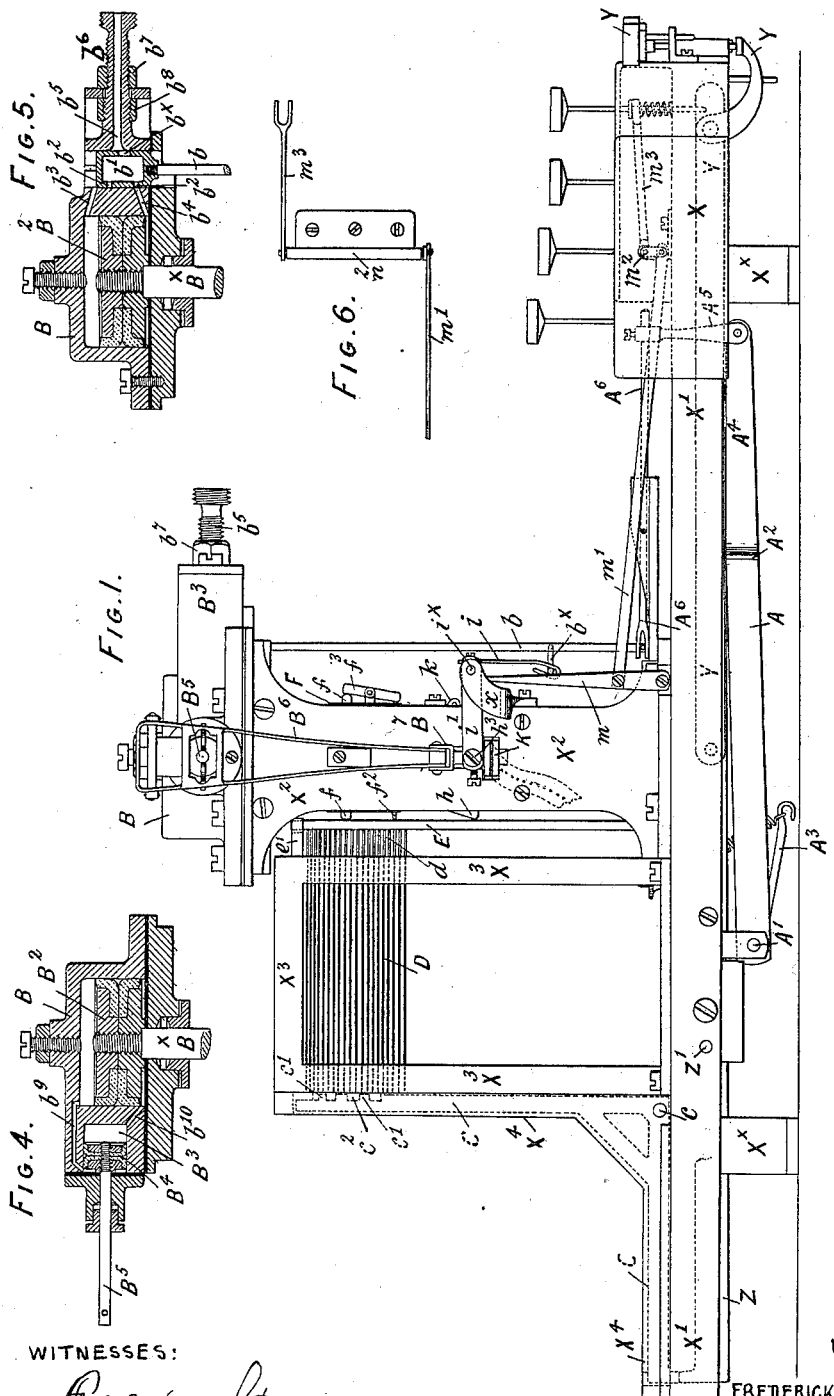

No. 652,595. Patented June 26, 1900.
F. G. CREED.
TELEGRAPHIC TRANSMITTING APPARATUS.
(Application filed Nov. 7, 1898.)
(No Model.) 5 Sheets—Sheet 1.

WITNESSES:

INVENTOR
FREDERICK GEORGE CREED
BY
HIS ATTORNEYS.

No. 652,595. Patented June 26, 1900.
F. G. CREED.
TELEGRAPHIC TRANSMITTING APPARATUS.
(Application filed Nov. 7, 1898.)
(No Model.) 5 Sheets—Sheet 2.

WITNESSES:
F. W. Wright
S. C. Connor

INVENTOR
FREDERICK GEORGE CREED
BY Howson and Howson
HIS ATTORNEYS.

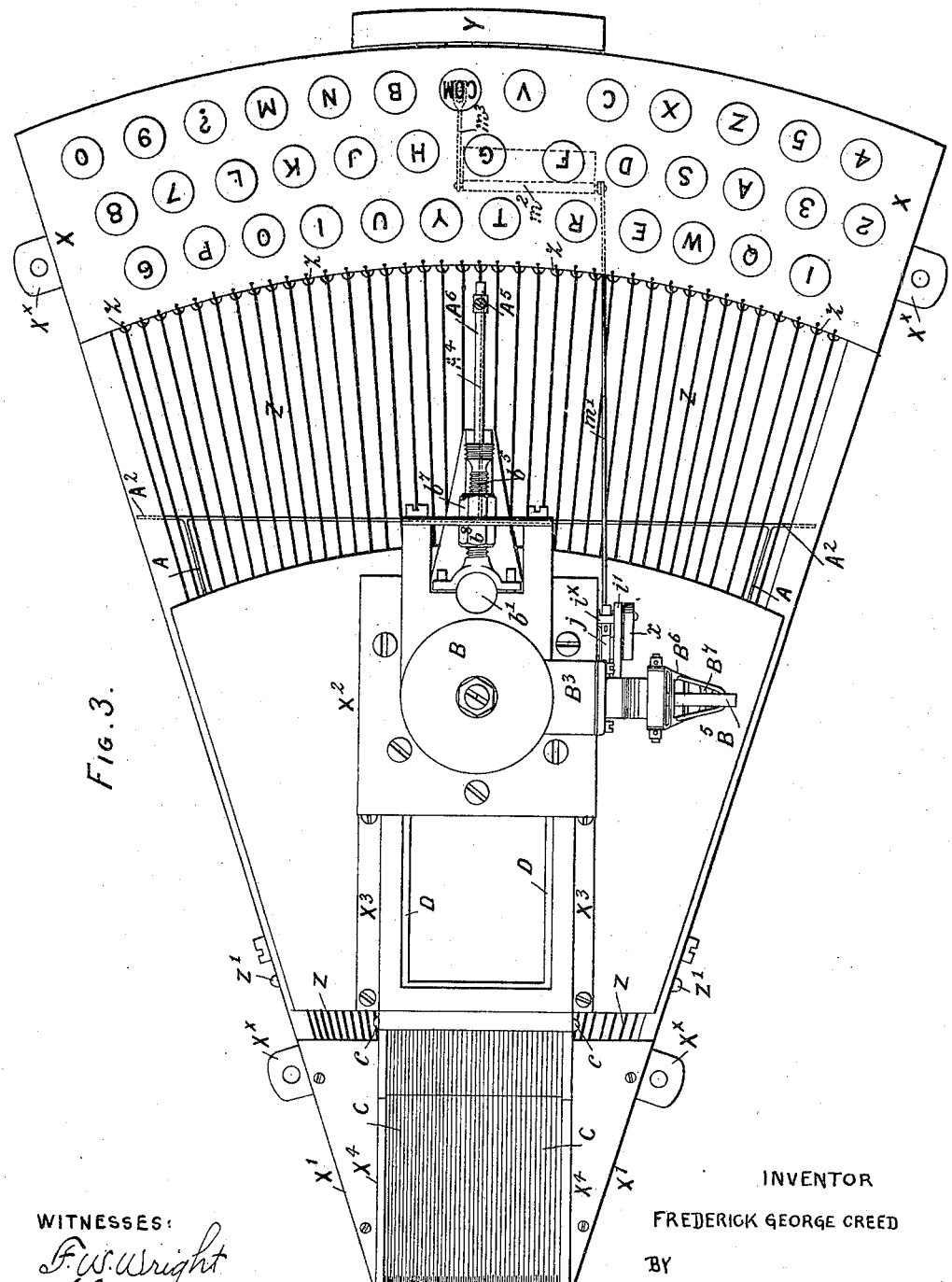

No. 652,595. Patented June 26, 1900.
F. G. CREED.
TELEGRAPHIC TRANSMITTING APPARATUS.
(Application filed Nov. 7, 1898.)
(No Model.) 5 Sheets—Sheet 4.
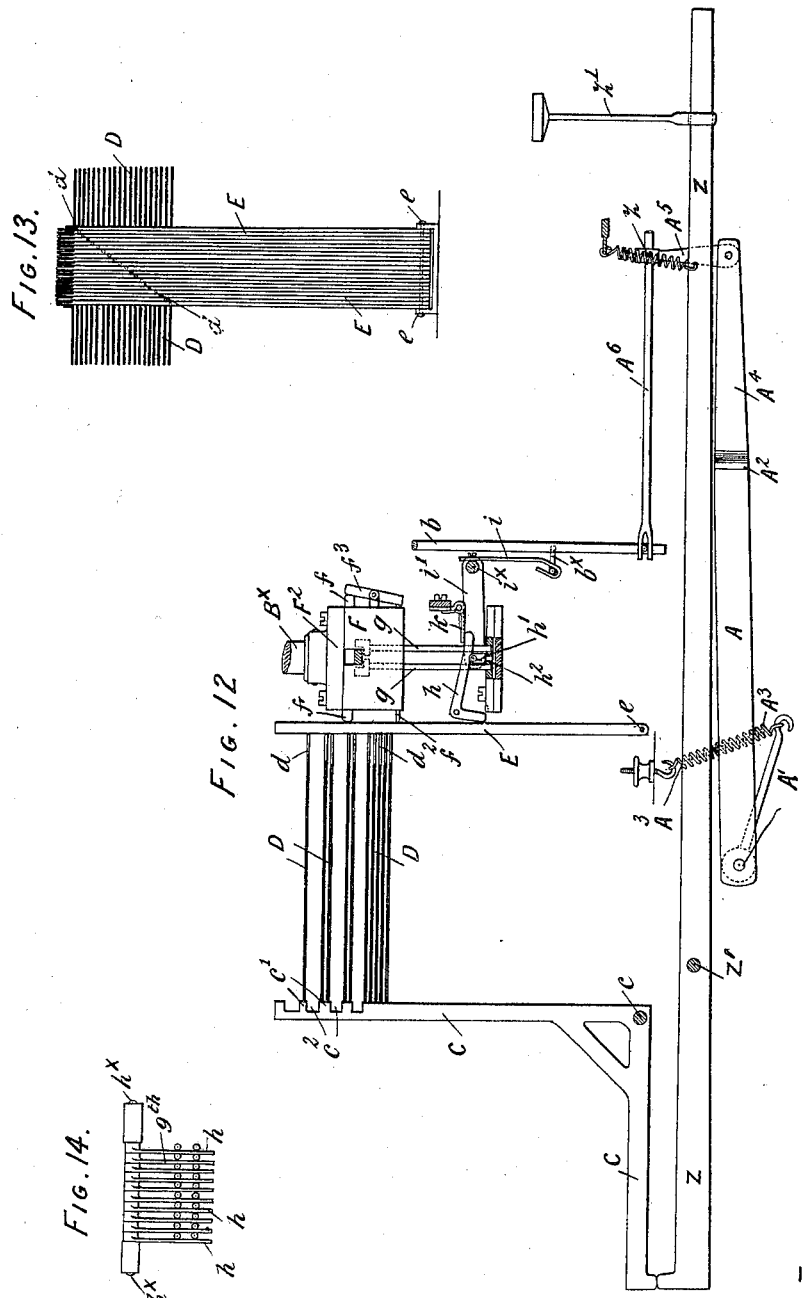
INVENTOR
FREDERICK GEORGE CREED
BY
Howson and Howson
HIS ATTORNEYS.
WITNESSES:
F. W. Wright
S. C. Connor No. 652,595.  
F. G. CREED.  
TELEGRAPHIC TRANSMITTING APPARATUS.  
(Application filed Nov. 7, 1898.)  
(No Model.)  
Patented June 26, 1900.  
5 Sheets—Sheet 5.

WITNESSES:
F. W. Wright
S. C. Connor

INVENTOR
FREDERICK GEORGE CREED
BY
Howson and Howson
HIS ATTORNEYS.

UNITED STATES PATENT OFFICE.

FREDERICK G. CREED, OF GLASGOW, SCOTLAND.

TELEGRAPHIC TRANSMITTING APPARATUS.

SPECIFICATION forming part of Letters Patent No. 652,595, dated June 26, 1900.

Application filed November 7, 1898. Serial No. 695,748. (No model.)

*To all whom it may concern:*

Be it known that I, FREDERICK GEORGE CREED, a subject of the Queen of Great Britain and Ireland, and a resident of Glasgow, Scotland, have invented certain new and useful Improvements in Telegraphic Transmitting Apparatus, of which the following is a specification.

It is the object of this invention to perforate a tape with holes representing the signs—"dots" and "dashes"—of the Morse and other similar telegraphic codes by means of such mechanism that a single stroke of any given key will produce at once all the perforations necessary to represent the complete character corresponding to such key and will cause the tape to be drawn forward a distance equal to the length of tape covered by the perforations representing such character plus the "space" or distance desired to separate this character from that which follows.

The machine can be operated by means of a keyboard in a similar manner and at equal speed to a type-writing machine and that without previous knowledge of the telegraph-code on the part of the operator.

It is expected by means of this invention greatly to reduce the initial delay in preparing messages for automatic transmission by existing and similar systems, to simplify the process of perforation itself, and generally to facilitate the work of automatic telegraphy.

This invention has no connection with any existing systems having for their object the transmission by telegraph of alphabetic lettering, meaning by that telegraph-machines which print the messages on a tape at the receiving-station.

My object is merely to perforate messages in the existing telegraph dot-and-dash codes for use in connection with such transmitters as will forward the messages by means of dot-and-dash signs to the receiving-station. To secure these results, the machine comprises a set of perforating-plungers sufficient in number to produce by various combinations the perforations which represent the dots and dashes corresponding in the telegraph-code to any given character. These plungers are operated upon in their appropriate combinations by means of levers controlled from the keyboard, which embraces all characters commonly used in telegraphy. Each key when struck plays upon a corresponding lever, which is provided with a notched and toothed combination representing its own character. This lever in turn sends forward the combination by means of certain of two other sets of levers which act directly upon levers set in the carriage which contains the plungers, driving these last levers over the heads of those plungers which are to be used in making the perforations. The piston of an air-engine coming into action at this moment forces these plungers through the tape, which is led through a slot in a die set directly under them. At the same moment a small traveler, armed with a set of small pins, being liberated is thrown backward by a lever connected to space-engine and arrested at a distance corresponding to the distance which it is desired to draw the tape forward. When the key is raised, this traveler by means of pins engages a continuous central row of perforations (with which the slip has previously been provided) and is then driven forward (carrying the tape with it) to its usual position of rest. The length of tape drawn forward by the traveler—that is to say, the length of the character-spaces—is regulated by a separate set of levers which arrest the traveler at the proper point. These levers are controlled by the same set of levers that control the levers of the plunger-carriage, and therefore by the key itself.

By this invention a small lever attached to a key is provided by means of which the space may be so regulated as to throw any desired number of letters into one combination.

In order to enable others skilled in the art to which this invention relates to understand how same may be carried into practice, I have hereunto appended five sheets of explanatory drawings, in which the same reference-letters are used to indicate like parts in the several figures where shown.

Figure 2:
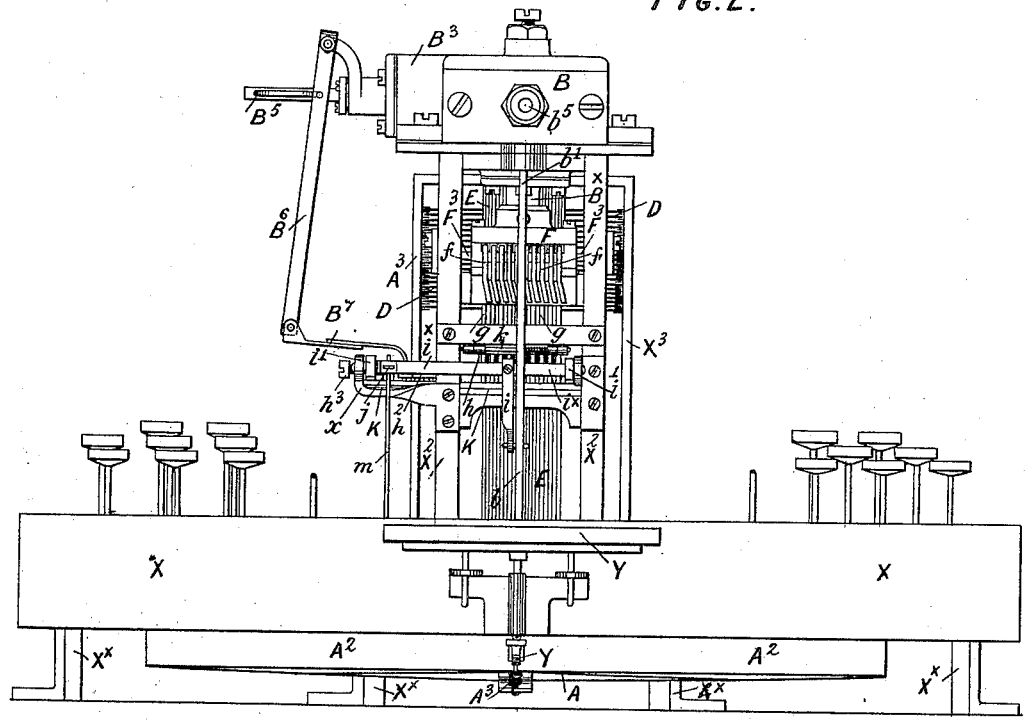
Figure 7:
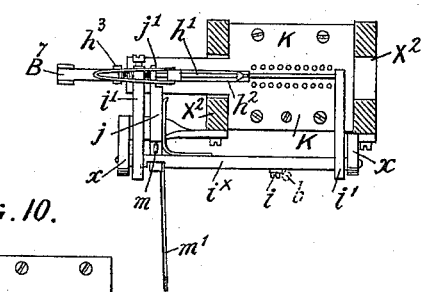
Figure 8:
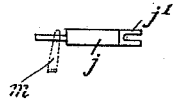
Figure 10:
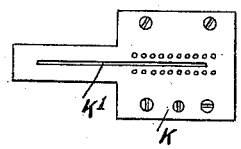
Figure 9:
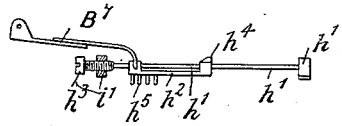
Figure 11:
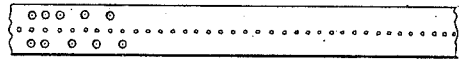
Figure 15:
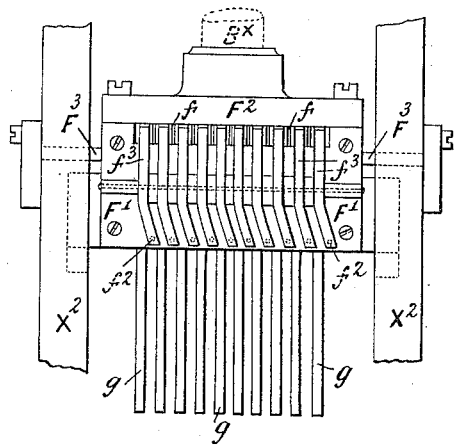
Figure 16:
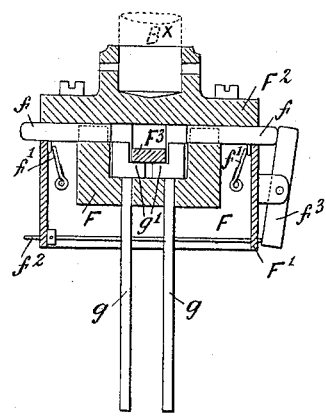
Figure 17:
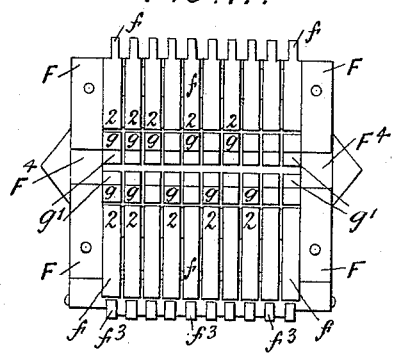
Figure 18:
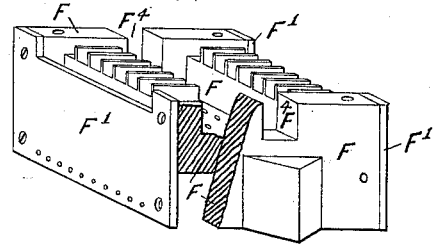
Figure 20:
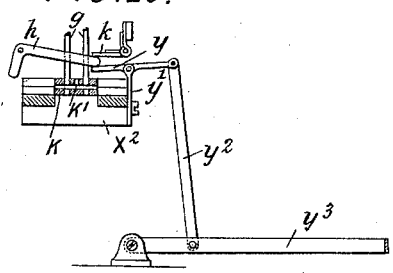
Figure 19:
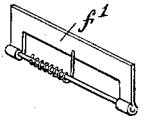
Figure 21:
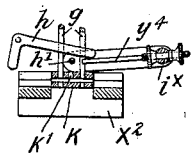

Figure 1 is a side elevation, Fig. 2 a front view, and Fig. 3 a plan, illustrating my invention, while Figs. 4 and 5 are sectional detail views of operating air-cylinders and valve for actuating the perforating-plungers and spacing-lever, respectively. Fig. 6 is a detail plan view of bracket carrying the lever connections for working the combination-lever to connect any number of letters together. Fig. 7 is a sectional plan view of spacing-carriage and connections; Fig. 8, a detail side view of combination-lever; Fig. 9, a side view of spacing-frame; Fig. 10, a plan of die-plate; Fig. 11, a view of the perforated tape, with perforations previously formed in the center for drawing tape forward in the machine and also showing example of the manner of perforating the figure "2" by the plungers of the perforator-carriage. Fig. 12 is a side view showing the levers operated when the figure "2" is struck on machine. Fig. 13 is a front view of the rectangular frames and levers D and E detached. Fig. 14 is a plan of space-levers $h$ for regulating the length of space for any letter. Fig. 15 is a front elevation of perforator-carriage F F' F², operating-levers, and plungers for perforating the tape. Fig. 16 is a sectional view at right angles to Fig. 15; Fig. 17, a plan of same with top F² removed; Fig. 18, a perspective view to show partitions or saw-drafts for sliding levers $f$. Fig. 19 is a perspective view of spring-frame lever $f'$. Fig. 20 is a detail view showing a method of lifting all the space-levers at one time when it is desired to have such an attachment on the machine, while Fig. 21 shows a detail view of an arrangement for lifting the first or left-hand space-lever when each key is struck.

Referring to the drawings, the machine-framing comprises a keyboard X, base-frame X', supported on feet X<sup>×</sup>, and standards X² X³ X⁴ to carry the various parts of the actuating mechanism. The key-levers Z, which may be thirty-seven or more in number, are made of strips of thin sheet-steel or other suitable metal or material set on edge side by side horizontally underneath the framing X' and fulcrumed at Z', the long ends being spread out fanwise toward the keyboard X and the short ends converging close together are guided in saw drafts or partitions let into the frame X', each key-lever being provided with a spring $z$ to return same to normal position each time a character has been struck.

Underneath the key-levers Z is set the frame A, fulcrumed at A' to a bracket on the machine-frame X and having a cross-bar A², on which the key-levers rest, and also the space-lever, the frame being kept firmly against same by means of an adjustable spring A³. The cross-bar or universal bar A² underruns the whole of the key-levers Z, and no key can be struck without imparting to the frame A a corresponding movement.

An arm A⁴ is formed on the frame A, to which is secured a link A⁵ to connect same to the lever A⁶ for actuating and controlling the valve-rod $b$ of air and space engine B B⁸, and also the space-lever connections, to be more particularly described.

As seen particularly in Fig. 12, when a key is struck the key-levers Z act on one end of L-shaped levers C within the standard X⁴, and these L-shaped levers C push forward and actuate rectangular frames D, guided in saw-drafts in the standard or framing X³ and which are only capable of forward-and-backward movement, but no side action. The pins $d$ on same, acting on levers E, produce the necessary combination within the perforator-carriage to allow of the particular perforations being punched according to the character struck. The levers Z and C are equal in number, and the rectangular frames D and E are preferably twenty in number to produce the combinations required for the various characters of the telegraphic system in use.

The vertical or upright arms of the L-shaped levers have teeth or notches cut on them for the purpose of producing the combination above referred to, the teeth $c'$ pushing forward the rectangular frames D, while the notches $c^2$ allow of the remainder not required to remain passive. The ends of L-shaped levers C are guided in saw-drafts corresponding to those that guide the key-levers. These rectangular frames D have pins $d$, as above described, to act on the levers E for actuating the levers and rods or pins $f f^2$ in the perforator-carriage, the pins being distributed diagonally across same, as indicated in Fig. 13, and it will be seen that the pin on first or bottom rectangular frame D makes contact with the first or left-hand straight lever E, and so on to the last or top rectangular frame D on the right hand. These levers are fulcrumed at $e$ and are capable of forward-and-backward movement and are guided by saw drafts or partitions $e'$, as seen in Fig. 1.

The perforator-carriage (shown fully in Figs. 15 to 19 of the drawings) is composed of a central casting F, having saw-drafts for sliding levers $f$, with side guide-frames F' and top cover F², with connection for securing to the piston-rod B<sup>×</sup> of the engine. The plungers $g$ pass through holes in the central casting F, and the rod F³ for bringing back these and also controlling the extent of travel runs through the groove F⁴ and is secured in the frame X²·of the machine. The perforator-carriage is also guided within the standards X² by V-shaped pieces formed or secured to the central casting F, and the side guide-frames F', that support and guide the rod or rods $f^2$, and levers $f^3$ for actuating the sliding levers at opposite end of carriage from the levers E are secured to same central casting, as also the spring-frames $f'$ for bringing all back to their normal position.

The engines for operating the perforator-carriage and also the spacing mechanism, Figs. 4 and 5, consist of ordinary double-action pistons B² B⁴, actuated by compressed air or other fluid and controlled by means of the hollow piston-valve $b'$. The air is led into the valve by the feed-pipe $b^5$, which ends in an adjustable half-collar $b^6$, by means of which all wear can be taken up simply by adjustment of the nuts $b^7 b^8$. Through the valve by the port $b^×$ it passes into the main engine B by way of either of the ports $b^2$ $b^2$ in valve, to the ports $b^3$ or $b^4$, respectively. From the cylinder of the main engine it enters by the leads $b^9$ $b^{10}$ to the space-engine $B^3$. The space-engine exhausts into as it feeds from the cylinder of the main engine B, which in turn exhausts directly into the air through either of the ports $b^3$ and $b^4$, respectively.

The perforator-carriage shown (indicated in Figs. 1, 2, and 12 and fully illustrated in Figs. 15 to 19) is set under the engine B within the standards $X^2$ and is capable of vertical reciprocating motion. The carriage is in such a position that the projecting ends of the sliding levers $f$ (preferably twenty in number, ten on each side, as seen in Fig. 17) on the one side are directly in front of and make contact with the first out of every pair of the straight levers E, beginning at the left, and the other ten make contact through the pins $f$ and levers $f^3$ with the alternate straight levers E. By way of illustrating the action of above the sliding lever $f$ (marked 2) touches the first straight lever E, the second sliding lever $f$ (also marked 2) touches the third straight lever E, &c. The pins $f^2$ bear an exactly-similar relation to the alternate straight levers E, beginning with the second—that is, the first pin $f^2$ touches the second straight lever E, the second pin touches the fourth straight lever E, &c., the tenth pin touching the twentieth and last straight lever E. All the levers and pins of the carriage are independent, so that any can be moved without affecting its neighbors. When one or more of the levers $f^3$ on the back side are pushed forward by the action of the straight levers E, they will project over the head of the plungers $g$, to which they correspond, and will force forward the spring-frame $f'$ with them until they are released, when the spring-frame will return them to their normal position. The same applies to the sliding levers $f$ on the other side, except that in their case the action is not direct, being communicated by means of the pins $f^2$ and the tilting levers $f^3$, the pins $f^2$ being placed between the plungers, as shown particularly in Fig. 15. It will be observed that when one of these sliding levers $f$ is pushed over the head of a plunger it practically connects that plunger with the top $F^2$ of the carriage, so that when the latter is forced down by the action of the piston $B^2$ the plunger $g$ that is so acted upon is forced down with it, making a perforation. Similarly it will be noticed that the plungers that are not so connected when the perforator-carriage F F' $F^2$ is forced down, having a clear space above them, are free to stand on the tape and slide up into that space (or rather they remain stationary while the carriage slides down) until the carriage rises, when by the action of the bar $F^3$ against the ledge $g'$, with which the head of each pin is provided, they are forced back into their normal position. The plungers $g$ project downward through the carriage into the guide-plate K of the die, which is fixed between the standards $X^2$ in the position shown in Fig. 12. The die and guide plates K are perforated with two rows of ten holes each to correspond with the plungers and have a slot $K'$ between the two plates for the passage of the tape. The long narrow slot $K'$ between the perforations is for the passage of the traveler-pins $h^5$, which engage and draw the tape forward, according to the length of character struck. The space-levers $h$, ten in number, are mounted on the horizontal axle $h^\times$ in such a position that their long ends project forward between the plungers $g$ (with the exception of the first—the left-hand—which lies against the left side of the first pair of plungers) a little above the guide and die plates, as indicated in Fig. 14. The short ends of these levers set backward, so as to make contact with the straight levers E, which control them. These short ends are each broad enough to make contact with or cover the movement of two of the straight levers E, so that each space-lever $h$ receives the action of and is controlled by one pair of straight levers E. If either one or both of any pair of straight levers is pushed forward, the corresponding space-lever will be acted upon and tilted up. The space-frame consists of two arms $i'$, fixed on the axle $i^\times$, pivoted on brackets $x$, Figs. 1, 2, 7, 9, and 12, and having between their inner ends a small rod $h'$, centered on the left side in the adjusting-screw $h^3$. Upon this rod is mounted the traveler $h^2$, fitted on the under side with the small pins $h^5$ and at the top with the projection $h^4$, Fig. 9, to engage with the space-levers $h$, which limit its travel. This traveler is connected by means of the connection $B^7$ to the lever $B^6$ of the space-engine $B^3$, which actuates it. The space-frame is set in such a position above the die K that the rod $h'$ of the same is just over the center of the slot $K'$ and so that the traveler when its pins $h^5$ are engaged in the tape will pass freely under the space-levers $h$, but when the pins are disengaged will be arrested by the space-levers $h$ unless these have been tilted up to let it pass. For the purpose of disengaging and engaging the pins of the traveler with the tape the arms $i'$ (and with them the rod $h'$, on which the traveler is mounted) are tilted up and down by means of the arm $i$, which gets its movement from the pin $b^\times$, attached to the valve-rod. To receive the action of the traveler-pins, the tape has previously been formed with a continuous central row of perforations, these perforations having the same relative space from center to center longitudinally as the plungers, and therefore the same space as the perforations made by the plungers.

The small lever $j$, Figs. 2, 7, and 8, is capable of sufficient backward-and-forward motion by the lever $m$, connecting-rod $m'$, fulcrum $m^2$, and lever $m^3$ to the key "C O M" on keyboard X of machine when such action is desired to interpose the shoulder or broad part of said lever between the traveler $h^2$ and the adjusting-screw $h^3$, thus cutting off the space which should separate the last letter struck from that which follows, producing a combination composed of the signals comprised in both. By means of this, as before stated, any conceivable combination of signals may be produced.

Before describing the action of the apparatus in connection with Fig. 12 it will be expedient to explain that the combinations described are those necessary for the perforation of the English Morse code for transmission by the Wheatstone apparatus. The perforation of the tape for use in connection with the modified forms of transmitter now in use on some lines with the same telegraphic code requires only a different set of teeth and notches (or "combination") on the L-shaped levers, producing thereby the necessary combinations of the plungers and spacing apparatus.

I can perforate any of the codes now in common use without alteration in the general action of my machine simply by altering the shape, size, and combinations of the plungers.

The Wheatstone system has been chosen for purpose of illustration as being the most difficult of perforation.

The action of the machine is as follows: Take, for example, the process of perforating the figure "2," consisting of two dots and three dashes, one of the longest combinations of the English Morse code, and illustrated in Fig. 11 of the drawings. When the key $z'$ is struck, that end of the key-lever Z is depressed, depressing also the frame A, which controls the valve $b$, the action of which will be hereinafter described after illustrating the process of making the combination of the character indicated. The back end of the key-lever Z being tilted upward by the stroke acts upon the horizontal end of its corresponding L-shaped lever C, tilting forward the long or vertical notched arm of same, the teeth or combination of which in this instance come in contact with the first, second, third, fourth, fifth, eighth, ninth, twelfth, thirteenth, and sixteenth rectangular frames D, as shown in Fig. 12, while the notches allow the remaining frames to remain stationary, these being left out of this figure for the sake of clearness. The frames thus struck are driven forward, operating in turn upon the corresponding upright straight levers E, which play upon the corresponding sliding levers $f$ and pins $f^2$ of the perforator-carriage F F' F², driving the respective sliding levers $f$ over the heads of their own plungers $g$, these sliding levers $f$ being marked with the figure "2," by way of illustrating this example. The plungers $g$ thus covered by the ends of the sliding levers $f$ will be seen by reference to Fig. 17, in which the levers $f$, brought into action in the above combination, are marked by the figure "2." These plungers $g$ are now ready to be driven through the tape; but before proceeding with the perforation it will be necessary to show the action which has simultaneously taken place upon the space-levers $h$ (shown in Fig. 12 and also in plan Fig. 14) and the space-frame $h'$. As the upright straight levers E were driven forward to act upon the carriage connections they also at same time operated upon the short ends of the first eight space-levers $h$, tilting up the long ends (see Fig. 12) to allow the space-frame $h'$ to travel the proper distance, according to the letter struck. That this must occur will be seen from the fact that at least one out of every pair in the first eight pairs of the upright straight levers E (counting, as always, from the left) has been pushed forward, and, as already explained, either one or both of any pair coming forward will lift the space-lever corresponding to that pair. By this time the valve-rod $b$, acted upon by the lever $A^6$ through the connections $A^4$ $A^5$ from the rigid frame A, has been pushed up nearly to full stroke, tilting up at same time, by means of the connection $i$, the arms $i'$ $i'$ of the space-frame. This tilting of the space-frame lifts the traveler $h^2$ far enough to free its pins $h^5$ from the center row of perforations in the tape, Fig. 11, by means of which the tape is drawn forward. At this moment the traveler $h^2$ is in its position of rest against the thin forked part $j'$ of the lever $j$, which intervenes between the traveler and the adjusting-screw $h^3$ of the space-frame. When in this position, the projection $h^4$ of traveler $h^2$ is distant exactly one space—that is to say, the distance occupied on the tape by the perforations representing a single "dot"—from the first space-lever. The traveler $h^2$ and the space-levers $h$ and the sliding levers $f$ and plungers $g$ of the perforator-carriage being acted upon as I have indicated, the valve $b'$ now finishes its upstroke, (and the key its downstroke,) and the compressed air or other fluid rushing through the ports $b^2$ $b^3$ instantly and simultaneously acts upon the piston $B^2$ of the main engine B and the piston $B^4$ of the space-engine $B^3$, forcing down the carriage by means of the one and by means of the other, through the piston $B^4$ and piston-rod $B^5$, lever $B^6$, and connection $B^7$ to the traveler $h^2$, throws back the traveler toward the right-hand side until it is arrested by the ninth space-lever $h$, (shown in plan Fig. 14,) which is the first one of its set that has not been lifted by the combination struck. As I have already explained, the sliding levers $f$ in passing over the heads of the plungers $g$ brought these into practically solid contact with the top $F^2$ of the carriage-frame, so that when the perforator-carriage F F' F² was forced down by the action of the piston $B^2$ the points of these plungers $g$ were driven through the tape, and the others, not used in this combination and being free, coming in contact with the resistance of the tape merely stood lightly upon it, their heads entering the clear space between them and the top $F^2$ of the carriage. The perforation being now complete, the key is released and the valve is brought back to its usual position, reversing the action of the pistons $B^2$ $B^4$. As the main piston $B^2$ rises it brings back the perforator-carriage to its former position, withdrawing from the tape the plungers $g$, which have been used in making the perforation, the other plungers, as has been shown, being forced back into place by the cross-bar $F^3$ acting upon the ledges $g'$. (This perforation as produced upon the tape will be seen by reference to Fig. 11.) The spring-frames $f'$ of the carriage now coming into action return the sliding levers and rods or pins $f$ $f^2$ to their former position and, with the aid of the spring-frame $k$ of the space-levers $h$, return the upright straight levers E, the rectangular frames D, and the L-shaped lever C to their normal position. When the valve-rod $b$ returns to its former position on the release of the key, its action upon the space-frame is reversed, so that just before the air begins to be admitted again at the port $b^4$ the pins of the traveler once more engage the center perforations of the tape, and therefore when the action of the engines is completely reversed as soon as the plungers are withdrawn the traveler $h^2$ flies forward (drawing the tape with it) to its former position of rest. It will be seen that the distance which the tape has thus been drawn forward corresponds exactly with the length of the perforated character plus one space. As the perforations in every case begin with the first left-hand plunger, it will be seen that all letters or characters perforated will show this one space between them unless an extra space or spaces are purposely produced by striking the space-key. As this space-key merely depresses the rigid frame A—that is to say, the valve connection—without producing any combination, it will be seen that only a single space will be made when it is struck.

If it be desired to throw any two or more characters into one combination, it is only necessary while the first key is pressed down to press the key marked "C O M" (thus interposing the lever $j$ between the returning traveler and its position of rest) and to hold down this combination-key while the other letter or letters are being struck. By this device the separating-space is cut out, causing all the letters so struck to appear as one combination. The purpose of this key is to provide for the perforation of certain signals used in telegraphy, but not with sufficient frequency to warrant giving them a place in the keyboard.

It is sometimes desirable to have the power of adding extra spacing arrangements to the machine as described, and for this purpose I have added two views, Figs. 20 and 21, by way of illustrating my method of performing same. According to Fig. 20 an arrangement is shown for the purpose of raising the whole of the space-levers $h$, and this is accomplished by a lever-frame $y$, that acts on the long legs of the space-levers $h$ to raise same when a long space is desired. This lever-frame $y$ is fulcrumed on a bracket $y'$ to the side of standard $X^2$ and is connected by a connecting-link $y^2$ to a key-lever $y^3$, the extra key of same being added to the keyboard. Referring to Fig. 21, this arrangement is for providing a double space at every stroke of space-key when this is desired, and for this purpose I fit to the rod $i^\times$ of the space-frame an adjustable finger or rod $y^4$ for the purpose of lifting the first space-lever $h$. It will be seen that this letter raises the first space-lever $h$ at every stroke of a character-key, as well as at the stroke of the space-key; but as the shortest character (the letter "E") also raises this lever by its own combination it will also be seen that the rod $i^\times$ will not affect the spacing, except in the case of the space-lever.

Having now described my invention, what I claim as new, and desire to secure by Letters Patent, is—

1. In a machine for perforating telegraphic tapes, the combination of a keyboard and punches with means for selecting the punches under the control of the keyboard and a cylinder and piston with valve for operating the selected punches.

2. In a machine for perforating telegraphic tapes, the combination of a keyboard, punches and means for selecting the punches from the keyboard with a cylinder and piston for operating the selected punches and a valve for said cylinder and piston operated by the keys.

3. In a machine for perforating telegraphic tapes, the combination of a keyboard, punches and means for selecting the punches from the keyboard with a cylinder and piston with valve for operating the selected punches and a variable feed for the tape controlled from the keys.

4. In a machine for perforating telegraphic tapes, the combination of a keyboard and punching mechanism controlled thereby, with a feed-traveler to act on the tape, stops controlled by the keys to limit its movement and an engine with piston to actuate the traveler.

5. In a machine for perforating telegraphic tapes, the combination of a keyboard, punches and means for selecting the punches from the keyboard with a cylinder and piston for operating the selected punches, a feed-traveler to act on the tape, stops controlled by the keys to limit the movement of the traveler and an engine with piston to actuate the traveler.

6. In a machine for perforating telegraphic tapes, the combination of a keyboard and punches controlled thereby, with a cylinder and piston for operating the selected punches, a tape-feed, an engine and piston to operate the said feed and a valve controlled by the keys to supply motive fluid to both pistons, all substantially as described.

7. In a machine for perforating telegraphic tapes, the combination of a keyboard, a series of punches controlled thereby and means for actuating the punches with a feed-traveler for the tape, stops controlled by the keys for limiting the movement of the traveler and an air-engine to actuate the traveler.

8. In a machine for perforating telegraphic tapes, the combination of a keyboard, a series of punches controlled thereby and an air-engine to actuate the selected punches with a feed-traveler for the tape, an air-engine to actuate the traveler and a valve for both engines controlled by the keys.

9. In a machine for perforating the telegraphic tapes, the combination of a keyboard, a series of punches controlled thereby and an air-engine to actuate the selected punches with a feed-traveler for the tape, an air-engine to actuate the traveler, a valve for both engines and a universal bar under the keyboard to actuate said valve.

10. In a machine for perforating telegraphic tapes, the combination of a perforator-carriage having a series of punches, sliding levers to lock the punches to the carriage, and means to actuate said carriage, with key-levers, upright L-shaped levers C horizontal sliding frames D and upright levers E, to actuate the sliding levers, substantially as described.

11. In a machine for perforating telegraphic tapes, the combination of a perforator-carriage having a series of punches, sliding levers to lock the punches to the carriage and means to actuate the carriage with a series of levers E controlling the sliding levers, sliding frames D having pins $d$ to act on said levers E and levers to actuate the said sliding frames.

12. In a machine for perforating telegraphic tapes, the combination of a perforator-carriage, having a series of punches with two sets of sliding levers to lock the punches to the carriage, rods and tilting levers to actuate one set of sliding levers and actuating-levers for the other set of sliding levers and for the said rods, substantially as described.

13. In a machine for perforating telegraphic tapes, the combination of a traveler having pins to engage holes in the tape with a space-frame on which the traveler can slide, means for oscillating the space-frame and means for sliding the traveler on the space-frame.

14. In a machine for perforating telegraphic tapes, the combination of a traveler having pins to engage holes in the tape with a space-frame on which the traveler can slide, a keyboard, means for oscillating the space-frame from the keyboard, stops for the traveler controlled by the keys and means for sliding the traveler on the space-frame.

15. In a machine for perforating telegraphic tapes, the combination of a traveler having pins to engage holes in the tape, with a space-frame on which the traveler can slide, a keyboard, means for oscillating the space-frame from the keyboard, stops for the traveler controlled by the keys and an air-engine to actuate the traveler.

16. In a machine for perforating telegraphic tapes, the combination of a traveller-feed for the tape with a rod $j$, a special key "C O M" and means for interposing said rod in the return path of the feed by the operation of said key, as and for the purpose described.

17. In a machine for perforating telegraphic tapes, the combination of a keyboard and punching mechanism with a traveler-feed for the tape, a rod $j$ and means for interposing said rod in the return path of the feed on the operation of a special key, as and for the purpose described.

18. In a machine for perforating telegraphic tapes, the combination of lever-frame $y$ connecting-link $y^2$ and extra key-lever $y^3$ for raising the space-levers $h$, for the purpose substantially as described.

19. In a machine for perforating telegraphic tapes, the adjustable finger $y^4$ in combination with the spindle $i^\times$ of the space-frame for lifting one space-lever to give an extra space, substantially as described.

In testimony whereof I have signed my name to this specification in the presence of two subscribing witnesses.

F. G. CREED.

Witnesses:
R. C. THOMSON,
WM. RUTHERFORD.